(12) United States Patent
Kostal et al.

(10) Patent No.: US 7,509,489 B2
(45) Date of Patent: *Mar. 24, 2009

(54) FORMAT-AGNOSTIC SYSTEM AND METHOD FOR ISSUING CERTIFICATES

(75) Inventors: Gregory Kostal, Kirkland, WA (US); Muthukrishnan Paramasivam, Seattle, WA (US); Ravindra Nath Pandya, Clyde Hill, WA (US); Scott C. Cottrille, Sammamish, WA (US); Vasantha K Ravula, Sammamish, WA (US); Vladimir Yarmolenko, Duvall, WA (US); Charles F. Rose, III, Redmond, WA (US); Yuhui Zhong, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 834 days.

This patent is subject to a terminal disclaimer.

(21) Appl. No.: 11/077,920

(22) Filed: Mar. 11, 2005

(65) Prior Publication Data

US 2006/0206707 A1    Sep. 14, 2006

(51) Int. Cl.
*H04L 9/00* (2006.01)
*G06F 7/04* (2006.01)
*G06F 17/30* (2006.01)

(52) U.S. Cl. .............................. 713/156; 726/5; 726/27
(58) Field of Classification Search ................. 713/156
See application file for complete search history.

(56) References Cited

U.S. PATENT DOCUMENTS

| | | | |
|---|---|---|---|
| 6,430,688 B1 | 8/2002 | Kohl et al. ................... 713/156 |
| 6,505,193 B1* | 1/2003 | Musgrave et al. .............. 707/3 |
| 6,675,296 B1* | 1/2004 | Boeyen et al. .............. 713/156 |
| 6,816,965 B1* | 11/2004 | Moore et al. ................. 713/158 |
| 2004/0003139 A1 | 1/2004 | Cottrille et al. ............. 719/331 |
| 2004/0148514 A1 | 7/2004 | Fee et al. ....................... 726/22 |
| 2005/0148323 A1 | 7/2005 | Little et al. ............... 455/414.1 |

* cited by examiner

*Primary Examiner*—Longbit Chai
(74) *Attorney, Agent, or Firm*—Woodcock Washburn LLP

(57) ABSTRACT

An improved certificate issuing system may comprise a certificate translation engine for translating incoming certificates and certificate requests from a first format into a second format. A certificate issuing engine may then operate on incoming requests in the common format. The issuing engine can issue certificates to clients according to its certificate issuing policy. The policy may be expressed as data in a policy expression language that can be consumed at runtime, which provides for flexible and efficient changing of issuing policy. Issued certificates can be translated back into a format that is consumed by the requesting client. Such translation can be performed by the translation engine prior to delivery of certificates to requesting clients.

16 Claims, 7 Drawing Sheets

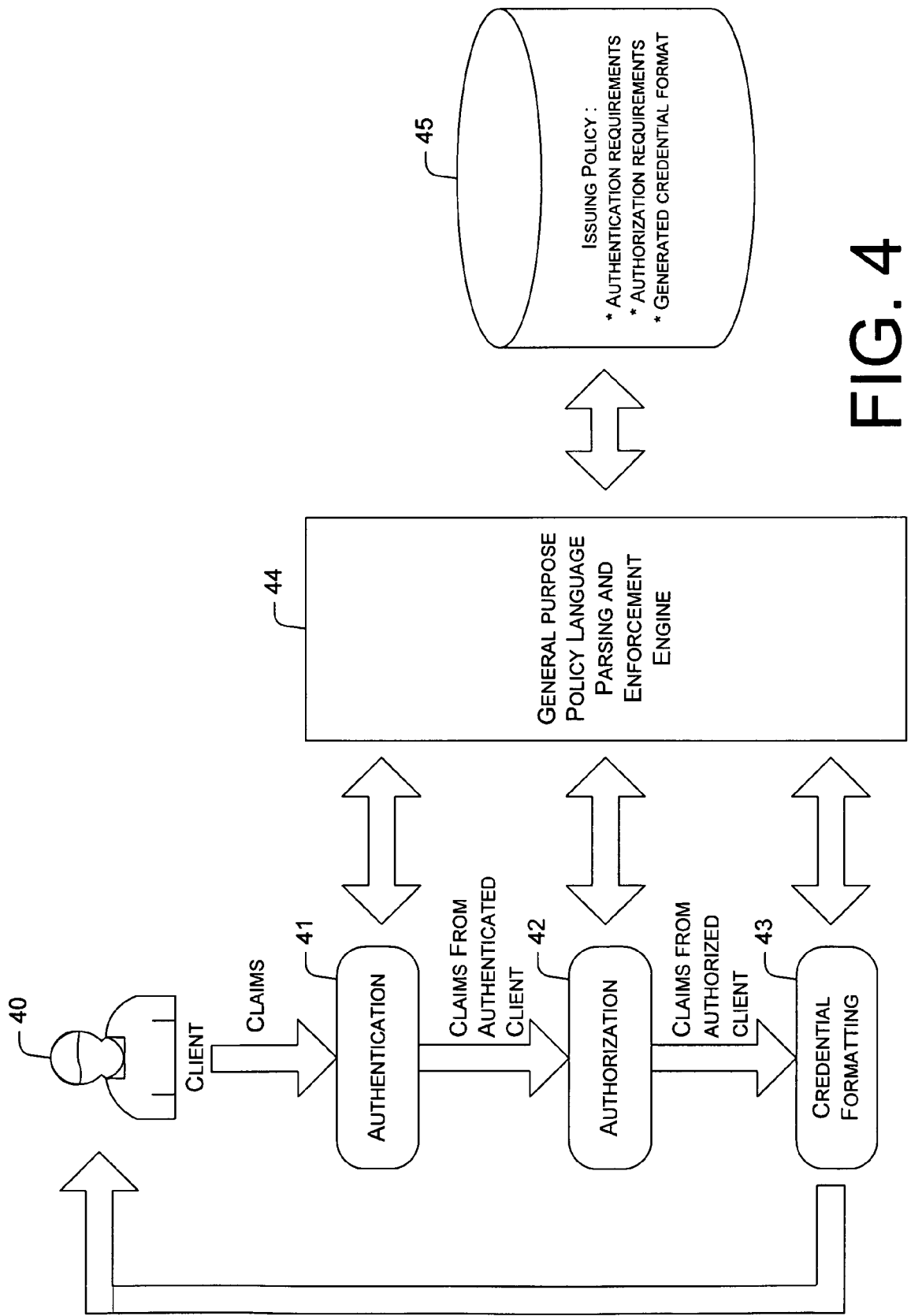

FORMAT-AGNOSTIC SYSTEM AND METHOD FOR ISSUING CERTIFICATES

CROSS REFERENCE TO RELATED APPLICATIONS

This application is related to U.S. patent application Ser. No. 11/069,803, filed Feb. 28, 2005, entitled "Extendable Data-Driven System and Method for Issuing Certificates."

FIELD OF THE INVENTION

This invention relates to computing security, and more particularly to the use of digital certificates to authenticate a client to a server and to determine client permissions, and more particularly to translation of such certificates to and from a common format in a certificate issuing system.

BACKGROUND OF THE INVENTION

A certificate is a document that attests to the truth of something or the ownership of something. In the world of computing, digital certificates serve a variety of functions. For example, a digital certificate may authenticate some entity by establishing that the entity is in fact what it claims to be. A digital certificate may authorize an entity by establishing that the entity is entitled to access a restricted resource. A digital certificate may also be used to capture "policy," e.g. authorization policy, trust policy, etc. in a tamper-proof fashion Certificates are very useful, and are at the present time experiencing increased use. Expression and enforcement of security policies is an increasingly important enterprise capability. The number of certificate formats is also proliferating. Some of the more popular certificate formats available today are the X.509, the Security Assertion Markup Language (SAML) security token, XrML 1.2, and MPEG-REL. Note that MPEG-REL has a number of variations and goes by a number of names, including XrML 2.x, MPEG ISO-REL, and ISO-REL. The acronym MPEG-REL, as used here, refers to at least all of these above-listed variations.

To illustrate the various functions and formats of the above exemplary certificates, X.509 certificates adhere to their own format and typically represent identity. SAML certificates adhere to their own XML schema and are widely used in federated identity solutions. XrML 1.2 and MPEG-REL express use policy for a resource and adhere to their own XML schema.

Services and products exist today which produce and consume certificates. A problem arises, however, as new types of certificates become popular. Presently, certificate issuing systems that consume certificates of a particular format may not be compatible with certificates of other formats. At best, this may result in inefficiency as the client attempts to obtain an appropriately formatted certificate, or by requiring the client to determine beforehand which certificate format is required by the server. At worst, it results in interoperability failure.

One possible solution that may be implemented is to maintain multiple side-by side certificate issuing servers that can handle certificates of different formats. This solution unfortunately makes implementation and update of certificate issuing systems more difficult. The effort required to implement and maintain multiple systems multiplies with each addition certificate issuer that is used.

Another weakness of present certificate issuing systems is that it is difficult to modify the circumstances under which a certificate may be issued, i.e. the "certificate issuing policy." In present systems, the policy is expressed as compiled algorithms in the certificate issuing system binary code or as a specifically modeled, "brittle" set of configuration parameters. Altering the enforcement policy requires recoding, recompiling and redeploying a new certificate issuing system. Thus, as a practical matter, certificate issuing policies are limited to those preconceived by certificate issuing system programmers. To change the policy, a certificate issuing system may have to be entirely recoded. This can take a product development team a significant amount of time and effort to accomplish.

Therefore, there is an unmet need in the industry to provide increased interoperability in certificate issuing as well as to facilitate changes to certificate issuing policies.

SUMMARY OF THE INVENTION

In consideration of the above-identified shortcomings of the art, the present invention provides an improved certificate issuing system and methods to be carried out by such an improved system.

The certificate issuing system provided herein may comprise a translating component for translating incoming certificates into a common format, and for translating outgoing generated certificates into any supported format. Thus the system may be described as format-agnostic. A single certificate issuing component that enforces a common certificate issuance policy can operate on certificates that arrive in a variety of formats. Certificates that are issued by an issuing component can also be translated into a variety of formats prior to delivery of such certificates to requesting clients.

The system may also comprise a novel arrangement for expressing certificate issuing policy. The policy may be expressed in a mark-up policy expression language and stored for example in a file that is consumed by a certificate issuing system at runtime. The policy may thus be easily changed by altering the file. Certain techniques are also provided for extending the capabilities of a certificate issuing system so it can apply and enforce new issuing policies.

Other advantages and features of the invention are described below.

BRIEF DESCRIPTION OF THE DRAWINGS

The systems and methods for issuing certificates in accordance with the present invention are further described with reference to the accompanying drawings in which:

FIG. 4 illustrates an issuing component portion of a certificate issuing system. Authentication 41, authorization 42, and credential formatting 43 are exemplary functions that may be performed by the issuing component. As part of performing these functions, a general purpose policy language parsing and enforcement engine 44 can apply a certificate issuing policy 45. The issuing component is thus data-driven in the sense that the policy to enforce need not be expressed in the engine 44, but rather in the issuing policy 45 that is consumed by the engine 44 at runtime.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

The apparatus and methods set forth herein generally pertain to issuing digital certificates. The term "certificate" is used herein as a short form for "digital certificate." As stated in the background, a certificate is a document that attests to the truth of something or the ownership of something. The term "attest" means to affirm to be correct, true, or genuine. Thus a first entity, which will be referred to herein as the client, may use a certificate to affirm some fact about itself to a second entity, the server. The certificate is typically, though not necessarily, issued by a trusted third party. As used here, a certificate can range from a self-generated document or token to a highly trusted digital file issued by a trusted third party with many security features, such as encryption according to one or more public/private key techniques and so forth. The "something" that is attested by a certificate may be anything. Typically, the client's identity and/or a client's authorization to obtain or access some resource may be attested, but anything else may also be attested to.

The trusted third party is referred to herein as a certificate issuing system. The term "certificate issuing system" may also be referred to herein and in the industry as a "certificate issuing service," and may be referred to for convenience simply by the term "issuer." Certificate issuing systems determine whether a particular client is entitled to a certificate. If so, the client is issued a certificate, and may then use the certificate to attest to a server.

While a client and server may be thought of as two complete computing devices, each comprising hard drive, bus, system memory, and so forth, those of skill in the art presently understand these terms in a broader sense. Client and server may in fact be two entities that exist within a single computing device, or across multiple computers in a distributed computing arrangement. In this regard, a certificate issuing system may also exist within a computer that houses one or more clients and one or more server entities, and may also exist across multiple devices.

Figure 1:
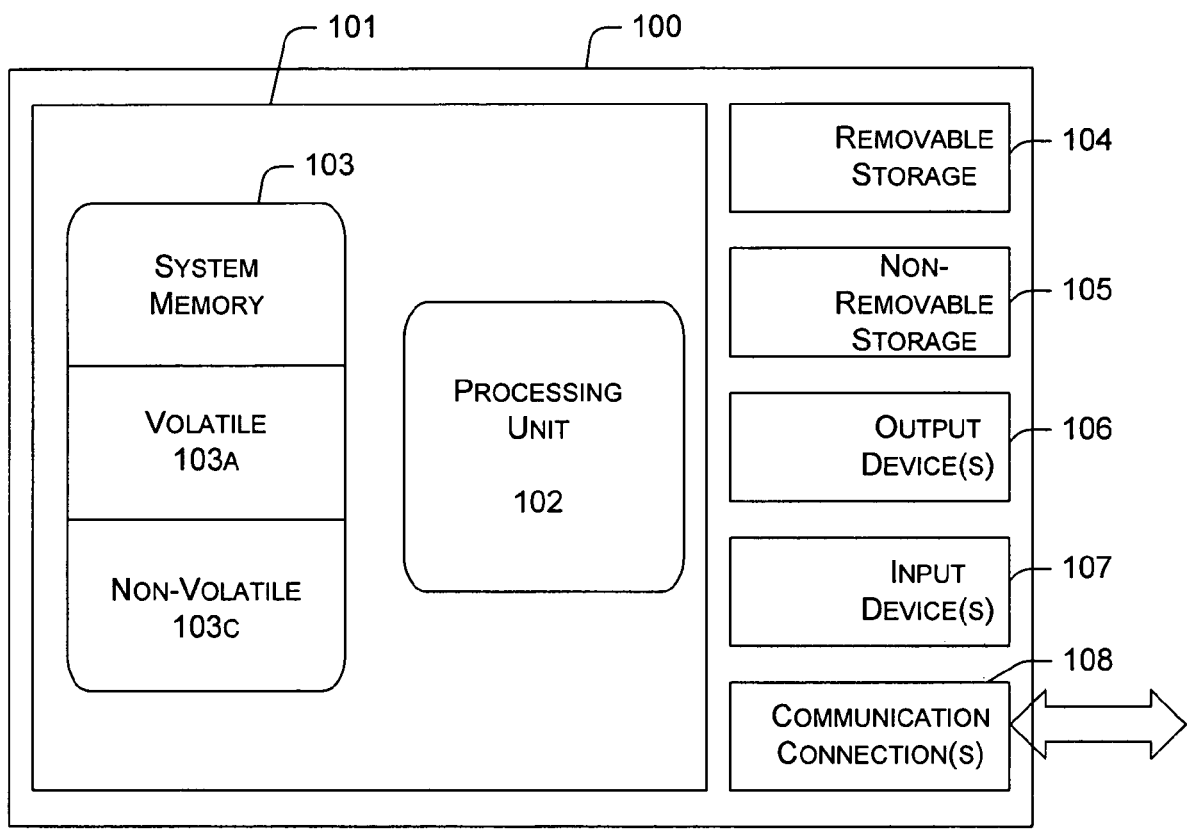
FIG. 1 is a block diagram broadly representing the basic features of an exemplary computing device suitable for use in conjunction with various aspects of the invention. The computing device may access instructions on computer readable media, and execute those instructions in an appropriate sequence for performing the functions of a certificate issuing system.

With reference to FIG. 1, an exemplary computing device 100 suitable for use in connection with the certificate issuing system is broadly described. In its most basic configuration, device 100 typically includes a processing unit 102 and memory 103. Depending on the exact configuration and type of computing device, memory 103 may be volatile 103A (such as RAM), non-volatile 103B (such as ROM, flash memory, etc.) or some combination of the two. Additionally, device 100 may also have mass storage (removable 104 and/or non-removable 105) such as magnetic or optical disks or tape. Similarly, device 100 may comprise input devices 107 such as a keyboard and mouse, and/or output devices 106 such as a display that presents a GUI as a graphical aid accessing the functions of the computing device 100. Other aspects of device 100 may include communication connections 108 to other devices, computers, networks, servers, and so forth using wired or wireless media.

Volatile memory 103A, non-volatile memory 103B, removable mass storage 104 and non-removable mass storage 105 are examples of computer readable media. Computer readable media may comprise communication media as well as computer storage media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computer storage media may be implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium.

The invention may be implemented, at least in part, via computer-executable instructions, such as program modules, being executed by a computer 100. Generally, program modules include routines, programs, objects, components, data structures, etc. that perform particular tasks or implement particular abstract data types.

Computer executable instructions are generally embodied as digital information available to computer 100 on some form of computer readable media. In FIG. 1, for example, system memory 103 may store an operating system and application programs as well as other program modules and program data. Applications and such may be bundled with an operating system, or may exist separately and draw upon operating system services to function.

It should be understood that while embodiments of the invention described herein may be software implementations, the various techniques described herein may also be implemented by replacing hardware components for at least some program modules. Thus, while the methods and apparatus of the present invention, or certain aspects or portions thereof, may take the form of program code in a high level procedural or object oriented programming language, the program(s) can also be implemented in assembly or machine language, if desired. In any case, the language may be a compiled or interpreted language, and combined with hardware implementations.

The invention is operational with numerous general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 2:
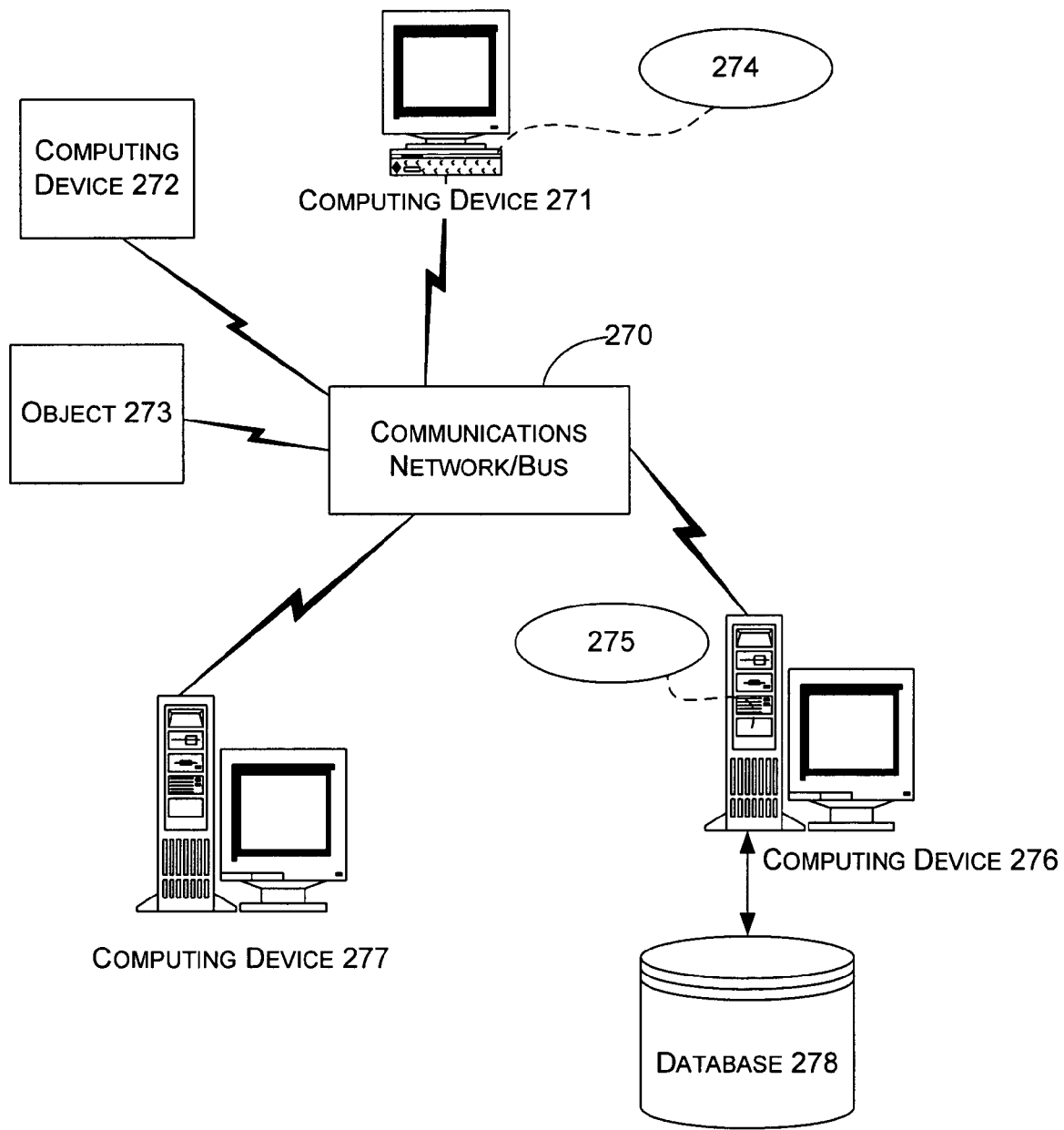
FIG. 2 illustrates an exemplary networked computing environment in which a certificate issuing system may operate. The issuer may reside for example on device 271. A client process at device 277 may request a certificate from the issuer at 271, and subsequently use the certificate in communications with a server process at device 275.

FIG. 2 provides an exemplary networked computing environment. The network comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270.

Devices on a network communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

The network may itself comprise other computing entities that provide services to the system of FIG. 2, and may itself represent multiple interconnected networks. Each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

The "client" is a member of a class or group that uses the services of another class or group to which it is not related. In computing, a client may be a process, i.e., roughly a set of instructions or tasks, that requests a service provided by another program. Such service may be, for example, the issuing of a certificate by a certificate issuing system. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Embodiments of the invention may thus address a situation where a client entity which requires a certificate resides in a first computing device in a network, e.g. 277. A server entity which may have some resource needed by the client entity may reside in a second computing device, e.g. 275. A certificate issuing system may reside in yet a third computing device, e.g. 271.

The client at device 277 may determine that it requires a certificate to attest to some client credential(s) for the server at device 275. The client at 277 thus submits a request across the network bus 270 to the issuer at 271. The request may itself comprise one or more previously issued certificates. The issuer at 271 proceeds to determine whether the client is entitled to the certificate it requested. The issuer at 271 accomplishes this by applying a certificate issuing policy. If the client at 277 has the credentials required by the policy, then the requested certificate may be issued to the client at 277 by the issuer at 271. The client may then use the issued certificate, along with any number of other certificates, in its communications with the server at 275.

Figure 3A:
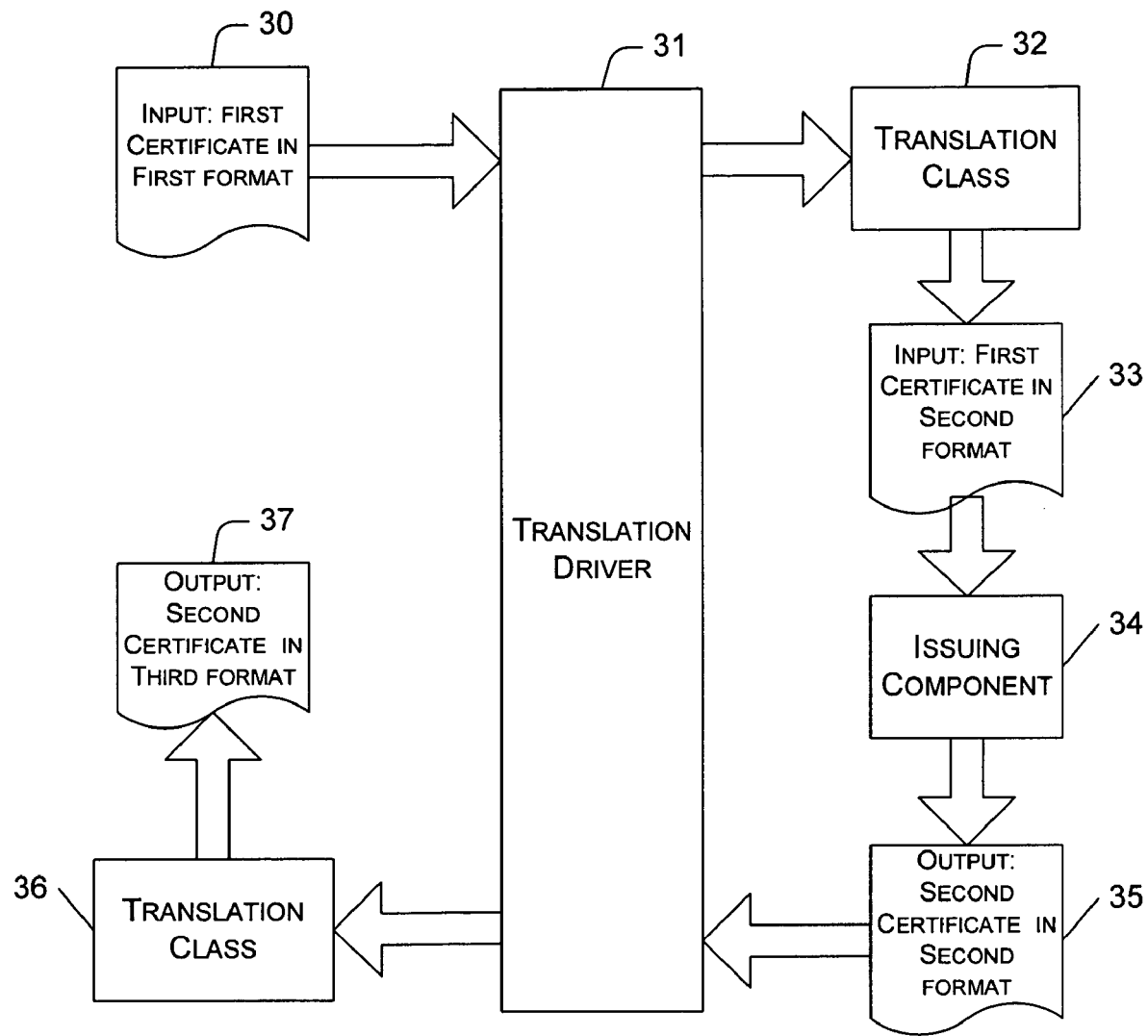
FIG. 3A illustrates a translation component portion of a certificate issuing system. The translation component, or translation engine, serves to transfer incoming certificates of multiple formats into a single common format. Certificates generated by the issuing component 34 in the common format for delivery to a client may be translated into any format as necessary.

FIG. 3A illustrates a translation component portion of a certificate issuing system. The issuing component 34 is illustrated in greater detail in FIGS. 4 and 5. In various embodiments of the invention, the translation component can be substantially the first component to receive an incoming certificate, and also substantially the last component to manipulate a certificate before it is delivered to a client. In other embodiments, the translation component may be used at any place in a certificate issuing system, as necessary.

When a request for a certificate arrives at a certificate issuing system, any accompanying certificates, such as a first certificate in a first format 30, can be routed to a translation driver 31. Translation driver 31 can operate to translate certificates to and from a common format used for operations of the issuing component 34. Thus, a first certificate in a first format 30 may be translated into a second format. The result of such a translation is the first certificate in the second format 33.

Conversely, when a certificate is issued by the issuing component 34, it can be translated from the format generated by the issuing component 34 into any format needed by a client. Thus, a second certificate in a second format 35 may be translated into a third format. The result of such a translation is the second certificate in the third format 37. This third format may be any certificate format, including the format of one or more certificates that arrived with a client request for a certificate, e.g., 30.

The certificate translation component is optimally designed to translate as many certificate formats as possible. In this regard, it may translate X.509 certificates, the Security Assertion Markup Language (SAML) security token certificates, XrML 1.2 certificates, and MPEG-REL certificates, to name a few of the more popular exemplary certificate formats. However, it may not always be economically feasible to design translation apparatus for each and every possible certificate type. The invention is not limited to the number or particular format of certificate types that are capable of translation by the translation component.

Because new certificate formats are continuously generated in the art, it is beneficial to design the translation component such that it can be extended to accommodate additional certificate formats. The driver 31 can manage the conversion of the various elements of a particular certificate 30 into a common-format certificate 33 based on the instructions provided by one or more classes, e.g., 32. The particular arrangement of FIG. 3A is advantageous because it allows for expandability of the translation component to accommodate new certificate formats. However, the driver 31 and classes such as 32, 36 arrangement in FIG. 3A is exemplary only, and those of skill in the art will recognize that a variety of arrangements are workable to accomplish conversion of certificates from one format to another.

In FIG. 3A, the common format is referred to as a second format. Selection of a common format involves determining a format that is as robust as possible to accommodate for all of the various types of information that may be contained in incoming certificates of a variety of formats. While any certificate may be selected to serve as the common format, including the X.509 format, the Security Assertion Markup Language (SAML) security token format, XrML 1.2 certificates, and MPEG-REL format, to name a few of the more popular exemplary certificate formats, the MPEG-REL has been selected for implementations of the invention and is presently considered advantageous for this purpose. MPEG-REL is currently considered the richest, most robust and extensible certificate format. However, as technology progresses other more advantageous certificates may be developed.

Another advantage of the use of a translation component stems from the fact that each of the various certificate formats express policy in its own way. A barrier to interoperability of present certificate issuers is format incompatibility, because to consume any particular format requires custom algorithms that permeate the issuer. We can not expect to convince all existing producers of certificates to adopt a common format, therefore we must assume these formats will continue to exist for the long-term. A technique for mapping or translating disparate certificate formats and their semantics into a common language thus reduces the systemic impact of the multiple formats, and is a step in the direction of solving the problem of certificate interoperability.

A correct translation should satisfy both syntax and semantic requirements. The former requires that a translated certificate has valid format. The latter requires the translated certificate conveys the same information as the original certificate. However, there are cases when the source format has more information than the target format which makes information loss in translation unavoidable. Thus a goal for implementation of the invention is to ensure the information is translated correctly while preserving other information at best effort.

The certification translation algorithms 32, 26 can be classified into two categories based on their functionality:

Syntax level: Mapping between constructs
Semantic level: Translation between certificates In one embodiment, this collection of algorithms is implemented as a set of classes. The set of classes is depicted in FIG. 3A as a certificate translation driver 31. Embodiments of a translation driver 31 may comprise three components: a driver class, a certification translation classes and configuration classes. The driver class may perform the overall coordination of the translation process and calls the translation classes. The translation classes may perform the actual translation process, and the configuration classes may contain necessary configuration data for the translation driver 31 to operate.

The following brief example is included to demonstrate an exemplary operation of a translation from a first certificate format, XrML 1.2, to a second certificate format, XrML 2.0. As will be appreciated by those of skill in the art, the first version of the MICROSOFT® (Rights Management Server product used certificates in XrML 1.2 format to do its policy evaluation. Future scheduled releases of the Rights Management Server product, however, will use certificates in XrML 2.0 format. Thus, the following provides a good example both of the operation of a translation component, and of the increasing need for the invention provided herein. The situation is as follows: a client sends a certificate request to a hypothetical Rights Management Server product that implements the invention. The request itself contains a certificate, e.g. certificate 30 in FIG. 3A, in XrML 1.2 format. XrML 2.0 is the common format used by the certificate issuing system 34.

To receive and understand certificates in both formats, a set of translation classes is implemented. Assuming this is accomplished, upon receiving a request from the client with a certificate 30 in XrML 1.2 format, the translation driver 31 creates a corresponding certificate translation class 32, passes configuration data to it and invokes translation method. The certificate translation class 32 validates the signature and validity interval of the XrML 1.2 certificate 30, translates it into an XrML 2.0 counterpart 33, and returns the translation-specific information to the translation driver 31. The translation driver 31 then calls the Rights Management Server 34 using the certificate 33 in XrML 2.0 format. Rights Management Server 34, in this example, natively understands XrML 2.0 certificates and performs the certificate issuing operations and sends the result back to the translation driver 31. After receiving a XrML 2.0 certificate 35 issued by the Rights Management Server 34, the translation driver 31 creates a certificate translation class 36 that translates the XrML 2.0 certificate 35 to an XrML 1.2 counterpart 37.

Figure 3B:
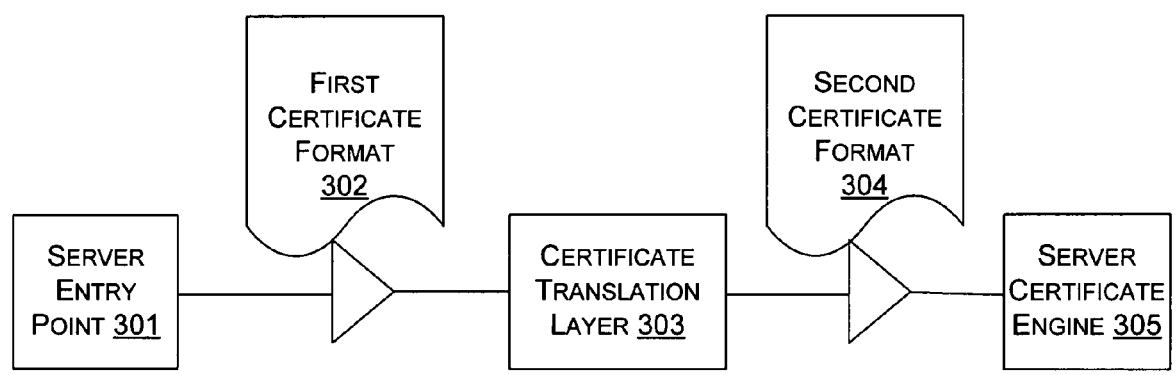
FIG. 3B illustrates a view of how an incoming certificate request is handled by an issuer. First, the request hits the server entry point 301. The certificate—or other request information—in its original format, e.g. 302, is passed to the translation layer 303. It is converted to a second format 304. The certificate and/or other information associated with the request 304 is then dealt with by the server certificate engine 305.

FIG. 3B illustrates a view of how an incoming certificate request is handled by an issuer. First the request hits the server entry point 301. The certificate—or other request information—in its original format, e.g. 302, is passed to the translation component, referred to as the translation layer 303. Note that certificates may not always accompany certificate requests. Attestation in some form is usually made, and while certificates are a beneficial way to verify the facts that are attested to, they need not accompany all certificate requests. Other information of various types may also be included in a request. When some other information is used, the specific data type of the information may differ in somewhat the same way certificate formats can differ. Thus, the certificate translation layer 303 may be configured to translate certificates such as 302 from one format to another, or from various formats to a single format, but can also be configured to manipulate any data that may accompany a certificate request. Such data, like incoming certificates, may be translated into a common format that can be consumed by a single issuing component or, as referred to here, certificate engine 305.

The incoming information in FIG. 3B can be converted to a second format 304. If the incoming information is already in the second format, naturally no translation is necessary. The certificate and/or other information associated with the request 304 may then be dealt with by the server certificate engine 305.

Figure 3C:
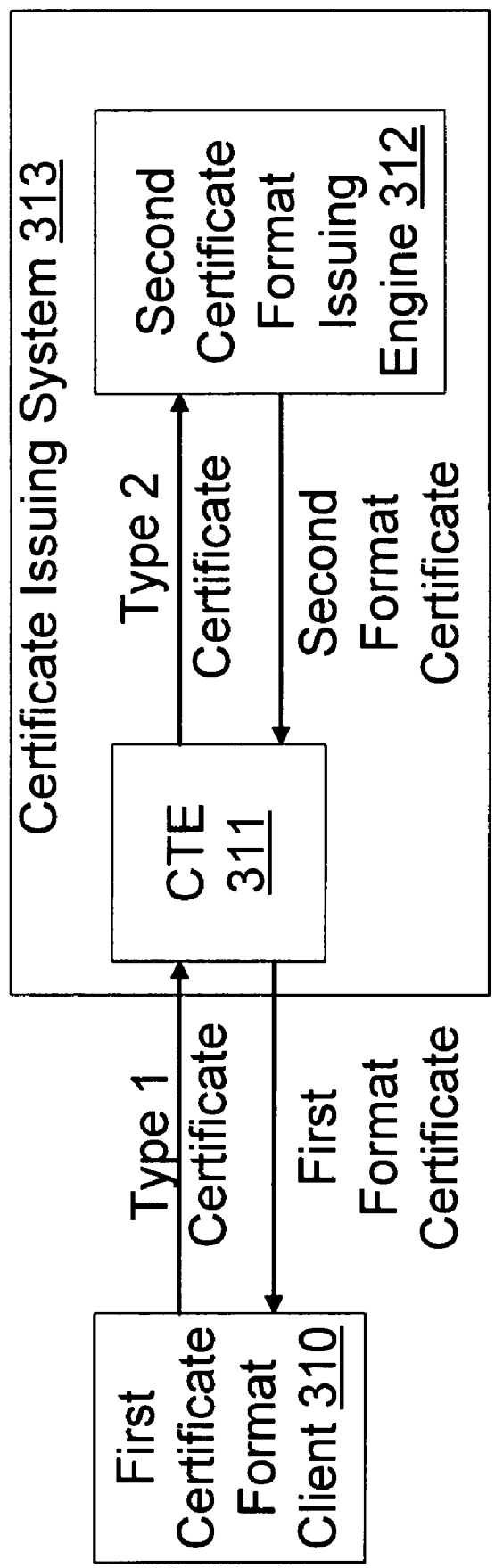
FIG. 3C illustrates another view of the invention in which a client 310 sends a request to server 313 for a certificate. A type 1 certificate is associated with the client 310 request. The type 1 certificate can be translated by the Certificate Translation Engine (CTE) 311 into a type 2 certificate. The type 2 certificate can be used by the issuing engine 312 to determine whether to grant the client 310 request. When the issuing engine 312 issues a certificate in a second format, the CTE 311 can translate it to a first format for client 310.

FIG. 3C illustrates another view of the invention in which a client 310 sends a request to server 313 for a certificate. The type 1 certificate is associated with the client 310 request. The type 1 certificate can be translated by the Certificate Translation Engine (CTE) 311 into some other format that is consumed by the issuer 312, such as a type 2 certificate. The type 2 certificate can be used by the issuing engine 312 to determine whether to grant the client 310 request. When the issuing engine 312 issues a certificate in a second format, the CTE 311 can translate it to a first format for client 310. Alternatively, the issuing engine 312 may simply generate certificates in the appropriate format for client 310, without re-using the CTE 311 to translate from the second format certificate to the first format certificate. Note that in many embodiments of the invention, the CTE 311 may be configured to handle multiple incoming certificate types. Each such type is preferably translated into a common type for operation of the issuer 312. Conversely, the CTE 311 is preferably configured to convert second format certificates from issuing engine 312 into any of a variety of certificate types, as may be requested by the client 310.

Among the exemplary scenarios that can profit from the use of a system such as that illustrated in FIG. 3C are certification of client devices and/or processes, granting of Client Licensor Certificate (CLC) requests and licensing of rights in digital content.

An exemplary certification scenario arises when a user using a client that operates with certificates of a first format (a "v1 client") tries to open a email protected by a rights management system for the first time. In this scenario, the v1 client might send, for example, a v1 Machine Account Certificate (MAC), which is currently an XrML 1.2 certificate representing the identity of a client machine, and WINDOWS® domain credentials to a certificate issuing system 313. The CTE 311 can translate the MAC into a Security Processor Certificate (SPC), which is currently an MPEG-REL certificate representing the identity of a client machine, and give the SPC to the issuing engine 312. The issuing engine might then issue a second format certificate, e.g. a Rights Account Certificate (RAC), currently a MPEG-REL certificate representing the identity of a user on a client machine, and send the RAC to the CTE 312. The CTE 311 may then translate the RAC to a first format certificate, for example a Group Identity Certificate (GIC), currently an XrML 1.2 certificate representing the identity of a user on a client machine. The issuing system 313 may then respond back the client 310 with the GIC.

An exemplary CLC request scenario is one in which a client 310 sends a request to issuing system 313 to obtain a certificate that authorizes the user to publish licenses for protected content offline. In this case, the CTE 311 can translate and incoming RAC associated with the request to a CLC, which can be processed by the issuing engine 312. Alternatively, the client 310 may send up a GIC which gets translated by CTE 311 to a SPC, and the issuer 312 may return a RAC which gets translated by CTE 311 to a CLC.

An exemplary scenario in which a system such as that of FIG. 3C might be used for licensing of rights in digital content is as follows: In order to consume rights-protected content, a v1 client 310 may make a licensing request to the issuing system 313. The client 310 might send a v1 publish license Issuance License (IL), for example an XrML 1.2 certificate delineating author specified usage rights for a particular piece of protect content, and GIC to the issuing system 313. CTE 311 may then translate the incoming IL and RAC, and give them to the issuing engine 312. If the issuing engine 312 grants a Use License (UL), e.g. an MPEG-REL certificate authorizing a particular user to access a particular piece of protected content, to the client 310, the CTE 311 may also translate an issued UL to an End User License (EUL), such as an XrML 1.2 certificate authorizing a particular user to access a particular piece of protected content, which is consumed by the v1 client 310. The issuing system 313 may then send the UL back to the client 310.

While a number of software designs may be employed to implement a CTE 311, as will be appreciated by those of skill in the art, and exemplary CTE design can comprise three components: a CTE driver, certification translation classes, and configuration classes.

In this design, the CTE driver interacts with the server entry point 301 and the server certificate engine 305. Upon receiving a certificate request, the driver creates a corresponding certification translation class, passes configuration data to the translation class, and invokes a translation method. The certification translation class then validates the signature and validity interval the certificate it is handling, for example using techniques such as a) signature validation, b) certificate validity interval expiration time and c) comparing the issuer to a set of trusted issuers. The certification translation class may also translate the certificate into a common format certificate counterpart, and return a common format certification string, along with other translation-specific information, to the CTE driver.

The CTE driver next calls the certificate engine 305 using the common format certificate. After receiving a generated common format certificate issued by the certificate engine 305, the CTE driver creates a certification translation class that translates the generated common format certificate to a counterpart certificate in a third format, for example, the format of the original incoming certificate.

Thus, an exemplary workflow for a CTE can proceed as follows:
Get certificate request from client
   Validate and decrypt if necessary an accompanying certificate
   Convert decrypted certificate to common format counterpart
     May replace certain information (keys, SPC . . . )
   Save any information that cannot be represented in common format certificate
   Call certificate issuing engine
Get issued common format certificate from certificate issuing engine
   Decrypt if necessary the issued common format certificate Convert decrypted issued common format certificate to
client-formatted counterpart
May use the information saved in the previous step
Encrypt and sign client-formatted certificate
Send client formatted certificate to client FIG. 4 illustrates an issuing component portion of a certificate issuing system. Once a translation is completed as described with reference to FIG. 3A, a translated certificate representation can be processed using the various functional components illustrated in FIG. 4. The translation component is not illustrated in FIG. 4 or FIG. 5 to avoid obscuring the figures. For an exemplary integration of the various components, refer to FIG. 3A.

A client 40 sends one or more claims along with its request for a certificate. A claim is any assertion made by an entity to be used in determining whether the entity is entitled to a certificate. If a claim is verified to be true, then the client entity 40 has demonstrated that it has a credential. One or more credentials may ultimately be required by a certificate issuing policy prior to issuing a certificate to the client 40. Such credentials may themselves be attested to by one or more certificates.

Authentication 41, authorization 42, and credential formatting 43 are exemplary functions that may be performed by the issuing component. As illustrated in FIG. 4, these functions may be performed serially in the order of authentication 41, then authorization 42, then credential formatting 43. This order is not required in all embodiments. Depending on what is needed to satisfy a client request, 41, 42, and 43 may each be performed independently, some sub-combination may be performed, or one or more of such functions may be performed along with some other function not illustrated in FIG. 4.

When 41, 42, and 43 are performed serially, the authentication process 41 may first determine whether the client 40 who makes claims to support a certificate request is in fact the entity that the client 40 claims to be. If this is proved, then the authorization process 42 may determine whether the client is authorized to receive a requested certificate. Alternatively, the authorization process 42 may simply determine an authorization level of the client 40 and record that in the certificate that is created. Finally, when a certificate is generated on behalf of the client 40, the client 40 credentials listed in the certificate may be formatted by 43 within a generated certificate. The following provides an exemplary algorithm that may be applied by a certificate issuing engine 44:

```
IssueCertificate (User input certificates, Server Issuance Policy)
    Based on issuance policy
        Authenticate user input certificates
        Authorize server for issuing certificate
        Construct resultant certificate as follows
            Create what client engine needs to authenticate
            Create grants allowed by issuance policy
                Authorize grant issuance
                    Call extension to authorize if required
                Generate grant
                    Call extension to generate part of the grant
                    if required
                Construct user rights as grants
        Sign the generated certificate
        Return the certificate
```

As part of performing the authentication 41, authorization 42, and credential formatting 43 functions, a general purpose policy language parsing and enforcement engine 44 can apply a certificate issuing policy 45. The issuing component is data-driven in the sense that the policy to enforce is not expressed in the engine 44, but rather in the issuing policy 45 that is consumed by the engine 44 at runtime.

While prior art certificate issuing systems apply and enforce a policy when generating a certificate, this policy is expressed in prior art issuers as compiled algorithms in the certificate issuing system binary code or as a specifically modeled, "brittle" set of configuration parameters. As a result, altering the enforcement policy in prior art issuers requires recoding, recompiling and redeploying a new issuer binary. In other words, the delivered issuer is limited to enforcing the set of policies preconceived by the certificate issuing system authors.

The certificate issuing engine 44 should include little or no preconceived policy structure. Instead, the engine 44 should contain a meta-data driven policy enforcement engine that honors the specific policy data from 45 which it encounters at runtime. This policy data 45 is expressed using a general purpose extensible policy expression language designed for use by the engine 44.

Engine 44 preferably operates on a single, common policy expression language and makes authorization decisions based on available policies and data in 45. By performing this processing on a homogeneous policy expression language format, the engine 44 logic is simpler, more efficient, and can be optimized for the chosen policy expression language. By being data-driven, the engine 44 can evaluate a broad range of expressed policies without having to change the engine 44 logic to accommodate new policies, semantics or structures. Engine 44 as illustrated in the figures comprises both the functional components for parsing and enforcing policy 45, and the functional components for generating certificates. The form of the certificates generated by engine 44 may be governed by policy 45 in addition to the other aspects of an issuing policy.

The policy expression language used to express policy 45 may take any of a wide variety of forms. The language used may be a mark-up language such as the Extensible Markup Language (XML), Hyper Text Markup Language (HTML), or some other mark-up language. As will be appreciated by those of skill, a set of human readable words and markings can be combined in such languages to exactly specify desired operations. A machine process such as engine 44 can be configured to consume files in this form at runtime and carry out the desired operations. Any policy expression language that is designed for use with the invention should be robust, extensible and flexible to accommodate for changes in policy and addition of language semantics as needed. Markup refers to the sequence of characters or other symbols that are inserted at certain places in a text or word processing file to describe the document's logical structure. The markup indicators are often called "tags." Markup can be inserted by the document creator directly by typing the symbols in or by using an editor and selecting prepackaged markup symbols (to save keystrokes).

XML is "extensible" because, unlike HTML, the markup symbols are unlimited and self-defining. XML is actually a simpler and easier-to-use subset of the Standard Generalized Markup Language (SGML), the standard for how to create a document structure. It is expected that HTML and XML will be used together in many Web applications. XML markup, for example, may appear within an HTML page. In this regard, the specified syntax used for the present invention may include combinations of mark-up languages.

In FIG. 4, the engine 44 applies a policy 45 expressed in the policy expression language and stored in digital format. Policy 45 may be manifested as one or more digital files, or as a database, or as any other stored data format. Those of skill will acknowledge that a digital file can be converted into any form: the aspects thereof may be inserted into fields of a database, or the file may be converted from one format to another. Thus, while it is contemplated that at least initially a policy is optimally created by a human in a digital format that can used by text editors, such as a file in common text (.txt) or document (.doc) format, such an initial digital file may be converted into any number of forms prior to storage in 45. Regardless of the format of data, the issuing policy 45 expressed therein must be satisfied by client 40 if client 40 is to be entitled to a requested certificate. Policy 45 may also govern the format of generated certificates, i.e. it may comprise policy for credential formatting.

Issuing policy 45 is preferably comprised of at least the following:

Client authentication requirements
Client authorization requirements
Certificate issuing service authorization requirements
Authorization enforcement instructions To draw once again on the popular MICROSOFT WINDOWS® Rights Management Server issuer for an example of a certificate issuing system, those of skill will acknowledge that this issuer can be used to implement "Information Rights Management" features for protected documents and email, for example the Information Rights Management features in MICROSOFT® Office 2003. As part of the solution, presently available versions of the WINDOWS® Rights Management Server deploy an issuer that includes a preconceived, hard-coded, brittle issuing policy definition. Only a fixed, well known set of issuing policies can be enforced—for example:

What are the trusted applications?
What users are specifically excluded?
What entities are trusted to issue user identification credentials?
What version(s) of the Rights Management software must the user run on their desktop?

In contrast, presently available versions of the WINDOWS® Rights Management Server cannot enforce new issuing policies, such as:

What are the trusted applications for a user's enterprise division?
What class of users are specifically excluded (e.g. all those whose network password will expire in less than 7 days)?
What specific credentials is the certificate issuing system trusted to generate?

By restructuring presently available versions of WINDOWS® Rights Management certificate issuing service to implement the systems and methods of the invention herein, the product could understand and enforce policies in a flexible policy expression language, and the new issuing policies listed above, as well as any other conceivable issuing policy, could be accommodated without altering the deployed issuer. Only the expressed policy in 45 would need to be altered.

A certificate issuing system can publish its issuing policy 45 along with the set of available issued certificate formats in order to facilitate client 40 discovery processes, forensic analysis, etc. The following is an exemplary issuing policy for the purpose of illustration:

```
<r:license licenseId="f34e026a-836c-4557-97db-4368b3eddd14"
xmlns:r="urn:mpeg:mpeg21:2003:01-REL-R-NS">
    <r:title>RightsAccountCertificateIssuancePolicyRoot-Public</r:title>
    <r:inventory>
        <r:forAll licensePartId="LP0" varName="ValidityInterval">
            <r:anXmlExpression>/r:validityInterval</r:anXmlExpression>
        </r:forAll>
        <r:forAll licensePartId="LP1" varName="AccountEncryptionPublicKey" />
        <r:keyHolder licensePartId="LP2">
            <r:info>
                <KeyName
xmlns="http://www.w3.org/2000/09/xmldsig#">RACIssuancePolicyRoot</KeyName>
                <KeyValue xmlns="http://www.w3.org/2000/09/xmldsig#">
                    <RSAKeyValue>
<Modulus>rrREhbeyebCOsKWeVh7KSc6oFJj6zZX8vJQQDKWxpDjwm7EvbSSgwt/3/ZVN5QJa8vclZ06
1gkp5hRGCs1VvJzSVs+duOcaz519uQXTCXft0tVuQkv7LCktbT5aKOpUuoDs26Hs/Vw4Cg4IJwbMAmyu
AZ27o6ngd1L1Vm7o/rr0=</Modulus>
                        <Exponent>AQAB</Exponent>
                    </RSAKeyValue>
                </KeyValue>
            </r:info>
        </r:keyHolder>
        <r:forAll licensePartId="LP3" varName="PrivateKey">
<r:anXmlExpression>/tm:privateKey/xkms:RSAKeyValue</r:anXmlExpression>
        </r:forAll>
        <r:forAll licensePartId="LP4" varName="Licensor">
            <r:propertyPossessor>
                <trustedLicensor xmlns="tm" />
                <r:trustedRootIssuers>
                    <r:keyHolder licensePartIdRef="LP2" />
                </r:trustedRootIssuers>
            </r:propertyPossessor>
        </r:forAll>
        <r:forAll licensePartId="LP5" varName="SidPrincipal">
            <r:anXmlExpression>/tm:sidPrincipal</r:anXmlExpression>
        </r:forAll>
    </r:inventory>
    <r:grant>
```

-continued

```
        <r:forAll licensePartIdRef="LP4" />
        <r:forAll licensePartIdRef="LP1" />
        <r:forAll licensePartIdRef="LP0" />
        <r:forAll varName="AccountInfo">
<r:anXmlExpression>/tm:account/tm:identity[@type="urn:msft:tm:identity:rfc822"
and contains("microsoft.com")]</r:anXmlExpression>
        </r:forAll>
        <r:principal varRef="Licensor" />
        <r:issue />
        <r:grant>
            <r:keyHolder varRef="AccountEncryptionPublicKey" />
            <r:possessProperty />
            <account varRef="AccountInfo"
xmlns="http://www.microsoft.com/DRM/XrML2/TM/v2" />
            <r:validityInterval varRef="ValidityInterval" />
        </r:grant>
        <r:validityInterval>
            <r:notBefore>2004-05-20T09:48:49Z</r:notBefore>
            <r:notAfter>2004-05-20T09:48:49Z</r:notAfter>
        </r:validityInterval>
    </r:grant>
    <r:grant>
        <r:forAll licensePartIdRef="LP4" />
        <r:forAll licensePartIdRef="LP1" />
        <r:forAll licensePartIdRef="LP0" />
        <r:forAll varName="KeyUsageInfo">
<r:anXmlExpression>/tm:keyUsage[@uri="urn:msft:tm:keyUsage:encryption" or
@uri="urn:msft:tm:keyUsage:signing"]</r:anXmlExpression>
        </r:forAll>
        <r:principal varRef="Licensor" />
        <r:issue />
        <r:grant>
            <r:keyHolder varRef="AccountEncryptionPublicKey" />
            <r:possessProperty />
            <keyUsage varRef="KeyUsageInfo"
xmlns="http://www.microsoft.com/DRM/XrML2/TM/v2" />
            <r:validityInterval varRef="ValidityInterval" />
        </r:grant>
    </r:grant>
    <r:grant>
        <r:forAll licensePartIdRef="LP4 " />
        <r:forAll licensePartIdRef="LP1" />
        <r:forAll licensePartIdRef="LP0" />
        <r:forAll varName="BindingPrincipalInfo">
<r:anXmlExpression>/tm:bindingPrincipals/r:allPrincipals/tm:sidPrincipal</r:anXmlExpression>
        </r:forAll>
        <r:principal varRef="Licensor" />
        <r:issue />
        <r:grant>
            <r:keyHolder varRef="AccountEncryptionPublicKey" />
            <r:possessProperty />
            <bindingPrincipals varRef="BindingPrincipalInfo"
xmlns="http://www.microsoft.com/DRM/XrML2/TM/v2" />
            <r:validityInterval varRef="ValidityInterval" />
        </r:grant>
    </r:grant>
    <r:grant>
        <r:forAll licensePartIdRef="LP4" />
        <r:forAll licensePartIdRef="LP1" />
        <r:forAll licensePartIdRef="LP0" />
        <r:forAll varName="CertificationPrincipalInfo">
<r:anXmlExpression>/tm:certificationPrincipals/r:allPrincipals/tm:sidPrincipal</r:anXmlExpression>
        </r:forAll>
        <r:principal varRef="Licensor" />
        <r:issue />
        <r:grant>
            <r:keyHolder varRef="AccountEncryptionPublicKey" />
            <r:possessProperty />
            <certificationPrincipals varRef="CertificationPrincipalInfo"
xmlns="http://www.microsoft.com/DRM/XrML2/TM/v2" />
            <r:validityInterval varRef="ValidityInterval" />
        </r:grant>
    </r:grant>
    <r:grant>
        <r:forAll licensePartIdRef="LP4" />
        <r:forAll licensePartIdRef="LP1" />
        <r:forAll licensePartIdRef="LP0" />
```

-continued

```
            <r:forAll varName="TrustedSecurityProcessor">
                <r:propertyPossessor>
                    <trustedSecurityProcessor xmlns="tm" />
                    <r:trustedRootIssuers>
                        <r:keyHolder licensePartIdRef="LP2" />
                    </r:trustedRootIssuers>
                </r:propertyPossessor>
            </r:forAll>
            <r:principal varRef="Licensor" />
            <r:issue />
            <r:grant>
                <r:keyHolder varRef="TrustedSecurityProcessor" />
                <r:possessProperty />
                <holdsPrivateKey xmlns="http://www.microsoft.com/DRM/XrML2/TM/v2">
                    <r:keyHolder varRef="AccountEncryptionPublicKey" />
                </holdsPrivateKey>
                <r:validityInterval varRef="ValidityInterval" />
            </r:grant>
    </r:grant>
    <r:grant>
        <r:forAll licensePartIdRef="LP4" />
        <r:forAll licensePartIdRef="LP1" />
        <r:forAll licensePartIdRef="LP0" />
        <r:principal varRef="Licensor" />
        <r:issue />
        <r:grant>
            <r:forAll varName="TrustedSecurityProcessor">
                <r:propertyPossessor>
                    <trustedSecurityProcessor xmlns="tm" />
                    <r:trustedRootIssuers>
                        <r:keyHolder licensePartIdRef="LP2" />
                    </r:trustedRootIssuers>
                </r:propertyPossessor>
            </r:forAll>
            <r:principal varRef="TrustedSecurityProcessor" />
            <receivePrivateKey xmlns="tm" />
            <r:keyHolder varRef="AccountEncryptionPublicKey" />
            <r:validityInterval varRef="ValidityInterval" />
        </r:grant>
    </r:grant>
    <r:grant>
        <r:forAll licensePartIdRef="LP4" />
        <r:forAll licensePartIdRef="LP3" />
        <r:forAll licensePartIdRef="LP5" />
        <r:forAll licensePartIdRef="LP0" />
        <r:principal varRef="Licensor" />
        <r:issue />
        <r:grant>
            <r:allPrincipals>
                <sidPrincipal varRef="SidPrincipal"
xmlns="http://www.microsoft.com/DRM/XrML2/TM/v2" />
            </r:allPrincipals>
            <decryptWithPrivateKey xmlns="tm" />
            <privateKey varRef="PrivateKey"
xmlns="http://www.microsoft.com/DRM/XrML2/TM/v2" />
            <r:validityInterval varRef="ValidityInterval" />
        </r:grant>
    </r:grant>
    <r:grant>
        <r:forAll licensePartIdRef="LP4" />
        <r:forAll licensePartIdRef="LP3" />
        <r:forAll licensePartIdRef="LP5" />
        <r:forAll licensePartIdRef="LP0" />
        <r:principal varRef="Licensor" />
        <r:issue />
        <r:grant>
            <r:allPrincipals>
                <sidPrincipal varRef="SidPrincipal"
xmlns="http://www.microsoft.com/DRM/XrML2/TM/v2" />
            </r:allPrincipals>
            <signWithPrivateKey xmlns="tm" />
            <privateKey varRef="PrivateKey"
xmlns="http://www.microsoft.com/DRM/XrML2/TM/v2" />
            <r:validityInterval varRef="ValidityInterval" />
        </r:grant>
    </r:grant>
    <r:issuer xmlns:r="urn:mpeg:mpeg21:2003:01-REL-R-NS">
        <Signature xmlns="http://www.w3.org/2000/09/xmldsig#">
            <SignedInfo>
```

-continued

```
                <CanonicalizationMethod
Algorithm="http://www.microsoft.com/xrml/lwc14n" />
                <SignatureMethod
Algorithm="http://www.w3.org/2000/09/xmldsig#rsa-sha1" />
                <Reference>
                    <Transforms>
                        <Transform Algorithm="urn:mpeg:mpeg21:2003:01-REL-R-
NS:licenseTransform" />
                        <Transform
Algorithm="http://www.microsoft.com/xrml/lwc14n" />
                    </Transforms>
                    <DigestMethod
Algorithm="http://www.w3.org/2000/09/xmldsig#sha1" />
                    <DigestValue>ZYG/bsCMxs5FhAT/atoXYGRuQ6Y=</DigestValue>
                </Reference>
            </SignedInfo>
<SignatureValue>Jd72Kt3h1fTYigxaYlrjaES+RLzmMZjr7bJBb9236GD7tty90zmZQxpYqTrA9D/q
mrca5k84BGzefXodP8uLokDxUkpdXEI4aVurCDjP7cHwtOnZdMR5ATMvSgPn4kLHZ6E0g2pX7gjAm8jI
tvmD49Sa2D9CKjOtORq5zEkQMLc=</SignatureValue>
            <KeyInfo>
                <KeyValue>
                    <RSAKeyValue>
<Modulus>rrREhbeyebCOsKWeVh7KSc6oFJj6zZX8vJQQDKWxpDjwm7EvbSSgwt/3/ZVN5QJa8vclZ06
1gkp5hRGCs1VvJzSVs+duOcaz519uQXTCXft0tVuQkv7LCktbT5aKOpUuoDs26Hs/Vw4Cg4IJwbMAmyu
AZ27o6ngd1L1Vm7o/rr0=</Modulus>
                        <Exponent>AQAB</Exponent>
                    </RSAKeyValue>
                </KeyValue>
            </KeyInfo>
        </Signature>
        <r:details>
            <r:timeOfIssue>2004-05-20T09:48:49Z</r:timeOfIssue>
        </r:details>
    </r:issuer>
    <r:otherInfo>
        <tm:infoTables xmlns:tm="http://www.microsoft.com/DRM/XrML2/TM/v2">
            <tm:infoList tag="#LicenseType">
                <tm:infoStr
name="licenseRole">RightsAccountCertificateIssuancePolicy</tm:infoStr>
                <tm:infoStr name="licenseVersion">1.0</tm:infoStr>
                <tm:infoStr
name="licenseType">RightsAccountCertificateIssuancePolicy-Public</tm:infoStr>
                <tm:infoStr
name="licensorUrl">http://rms.microsoft.com/rms/certification</tm:infoStr>
            </tm:infoList>
        </tm:infoTables>
    </r:otherInfo>
</r:license>
```

Figure 5:
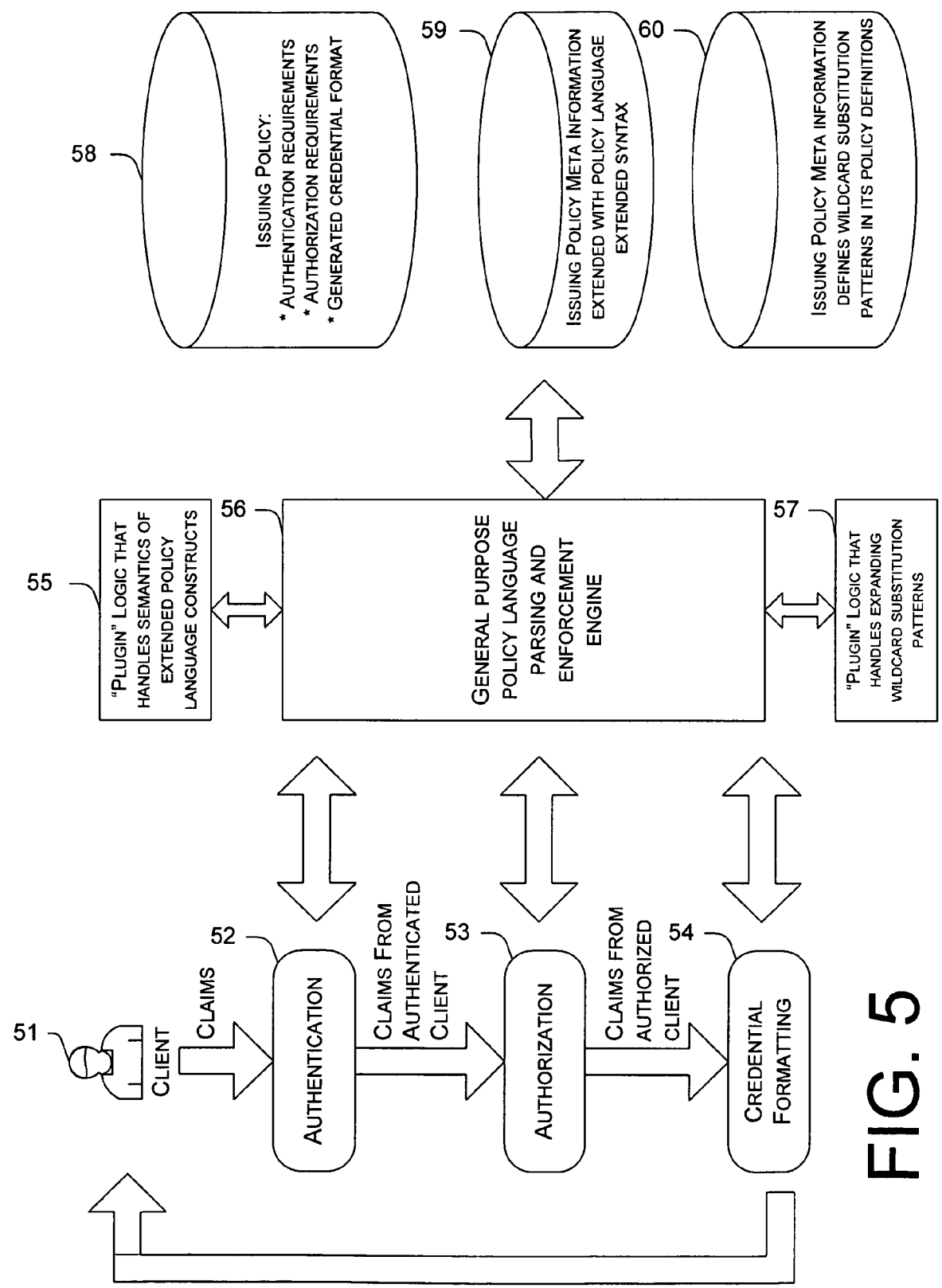
FIG. 5 illustrates systems and methods for extending the issuing component to apply and enforce new issuing policies that are not natively supported by the policy expression language and/or by the policy language parsing and enforcement engine 56. When the policy language syntax is extended, e.g. in 59, plug-in logic that handles semantics of extended policy language constructs 55 can be added to the enforcement engine 56. When native policy language wildcards are used, plug-in logic that handles expanding wildcard substitution patterns 57 can be added to the enforcement engine 56.

FIG. 5 illustrates systems and methods for extending the issuing component to apply and enforce new issuing policies that are not natively supported by the policy expression language and/or by the policy language parsing and enforcement engine 56. When the policy expression language syntax is extended, e.g. by combining additional data 59 with the issuing policy data 58, plug-in logic 55 that handles semantics of extended policy expression language constructs can be added to the enforcement engine 56. When native policy language wildcards are used, e.g. by adding wildcard substitution pattern data 60 to issuing policy data 58, plug-in logic 57 that handles expanding wildcard substitution patterns 60 can be added to the enforcement engine 56.

The data-driven policy evaluation engine 56 may be designed to anticipate semantics of certificates that it does not understand or is not intended to process. An extensibility mechanism for these certificate semantics may be present whereby custom logic such as 55 or 57 for such a certificate is interrogated to either provide a value, perform custom processing, or otherwise handle the unknown semantics in a well-defined manner. The results of this processing may feed back into the policy evaluation engine 56 and possibly influence the final results of a determination of entitlement to a certificate.

There are at least two mechanisms contemplated herein for extending the issuing component. First, by building atop an extensible policy expression language (e.g. one that leverages the extensibility of XML) and providing the appropriate plug-in mechanisms, such as 55, a certificate issuing system can support custom extensibility to its customers. Second, by including the concept of wildcard substitution patterns in its policy expression language and providing the appropriate plug-in mechanisms, such as 57, an issuer can support custom extensibility to its customers Beginning with the first of the aforementioned options for extending the issuing component, the policy expression language syntax is extensible in preferred embodiments. A policy enforcement engine 56 can be preconfigured to "know" how to honor the semantic meaning of the original aspects of the policy expression language. However, if the semantics of the policy expression language are extended, the engine 56 must also be extended.

Extensions of the policy expression language may be set forth in digital data 59 that is accessible by the engine 56.

Such extensions 59 may be manifested as one or more files, or as a database, or as any other stored data format. While extensions are optimally created by a human in a format that is used by text editors, such as a file in common text (.txt) or document (.doc) format, such an initial file may be converted into any number of forms prior to storage. Regardless of the format of data, the issuing policy extensions 59 expressed therein may be accessed by custom logic 55 to apply and enforce policies expressed using the extended policy expression syntax 59.

To accomplish this, the engine 56 can be configured to allow extended logic (aka. "plug-ins"), such as 55, to be registered. Plug-in 55 may provide the semantic backing for any new syntactical extensions 59 of the policy expression language. Unanticipated customer requirements can thus be addressed without overhauling the engine 56 itself or the originally used syntax of the policy expression language. The policy expression language is ideally designed to syntactically support extension.

An example may help clarify extensibility of engine 55 using plug-in 55. Suppose a certificate issuing system ships with an XML policy expression language that contains an element that represents a user's PKI identity . . . perhaps it looks like the following:

```
<user>
    <name>George Washington</name>
    <publickey>1234567890</publickey>
</user>
```

A certificate issuing system customer might want to extend the notion of a user to include a user's enterprise Lightweight Directory Access Protocol (LDAP) identity. A policy language extension to include LDAP syntax could be supported with code that performs an LDAP query on a certificate issuing system database when required. In this case, the extended policy language construct might look like the following:

```
<user>
    <name>George Washington</name>
    <publickey>1234567890</publickey>
    <extension:ldapid>georgewashington</extension:ldapid>
</user>
```

Additionally, the code that verified a user with an LDAP query, namely plug-in 55, would be compiled and registered with the certificate issuing system. This plug-in 55 would be invoked by the engine 56 when it encountered the extended policy expression language syntax. Note that in some embodiments, it may be possible to use the extended syntax without registering a plug-in. This can be accomplished by adding the same extended syntax to both the input/output certificates and the issuance policy data interpreted by the engine.

Turning now to the second option for extending the issuing component, the policy expression language that is used may include wildcard substitution parameters. Wildcard substitution patterns may be set forth in an original issuing policy 58, or may be added to the policy by making additional data 60 available to supplement the original policy 58.

Wildcard substitution patterns 60 may be manifested as one or more files, or as a database, or as any other stored data format. While initial substitution patterns are optimally created by a human in a format that is used by text editors, such as a file in common text (.txt) or document (.doc) format, such an initial file may be converted into any number of forms prior to storage in 60. Regardless of the format of data, wildcard substitution patterns 60 expressed therein may be accessed by custom logic 57 to apply and enforce wildcards in a fashion dictated by the custom logic 57.

If the policy expression language includes wildcard definitions 60 within its syntax and the engine 56 provides a mechanism to register custom logic 57 to select a particular desired value, then this provides yet another avenue of extensibility to the certificate issuing system.

Again, an example may help clarify. An exemplary certificate issuing system may contain policy that defines the format of issued certificates. For example, the service may contain a certificate issuing policy that states that the service may issue "trusted employee certificates" to a client. Since the issuer must respond to a dynamic universe of clients, the wildcard certificate issuing policy might be structured as:

The certificate issuing system can issue the "trusted employee certificate" to any client it deems appropriate.

The certificate issuing system owner can then define and register logic, e.g., 57, that fills in the specifics of which clients to "deem appropriate." The logic 57 can determine which clients should be issued the "trusted employee certificate" during a particular service invocation. This logic 57 can be invoked by the certificate issuing system when it encounters the more general wildcard definition clause in the certificate issuing policy.

In light of the diverse computing environments that may be built according to the general frameworks provided in FIGS. 1 and 2, the systems and methods provided herein cannot be construed as limited in any way to a particular computing architecture. Instead, the present invention should not be limited to any single embodiment, but rather should be construed in breadth and scope in accordance with the appended claims.

What is claimed:

1. A certificate issuing system comprising at least one computing device executing computer-readable instructions for generating a certificate in response to a client request, comprising:

a processor;

a receiving component for receiving the client request from a client, the client request comprising a first certificate in a first format, wherein the receiving component transmits the first certificate;

a translation component for receiving the first certificate from the receiving component, translating the first certificate into a common format, and transmitting a translated first certificate;

an issuing component for receiving the translated first certificate from the translation component and determining whether the client is entitled to a second certificate by comparing information from the translated first certificate with a certificate issuing policy, wherein the certificate issuing policy is loaded onto the issuing component prior to the determination, wherein the issuing component generates the second certificate in the common format if the translated first certificate establishes that the client has at least one credential required by the certificate issuing policy and transmits the second certificate to the translation component, and wherein the translation component translates the second certificate from the common format into a second format and transmits a translated second certificate; and a transmitting component for transmitting the translated second certificate to the client.

2. The system of claim 1, wherein the issuing component comprises an interface for communicating with custom components that enforce generic expressions in the certificate issuing policy.

3. The system of claim 1, wherein the issuing component comprises an interface for communicating with custom components that enforce extensions of the certificate issuing policy.

4. The system of claim 1, wherein a client identity is authenticated when the first certificate establishes that the client has the at least one credential.

5. The system of claim 1, wherein a client authorization is established when the first certificate establishes that the client has the at least one credential.

6. The system of claim 1, wherein the certificate issuing policy comprises a requirement for a form of the second certificate, and wherein the issuing component generates the second certificate according to the form.

7. A method for issuing security certificates to a client device, comprising:
    loading onto a policy engine at a server a certificate issuing policy;
    receiving a request from the client device for a second certificate at the server, the request comprising a first certificate;
    transmitting the first certificate to a translation component at the server;
    at the translation component, translating the first certificate from a first format into a common format;
    transmitting a translated first certificate to the policy engine;
    at the policy engine, determining whether the client device is entitled to the second certificate by comparing information from the translated first certificate with the certificate issuing policy;
    generating the second certificate in the common format if the translated first certificate establishes that the client has at least one credential required by the certificate issuing policy;
    transmitting the second certificate to the translation component;
    at the translation component, translating the second certificate from the common format into a second format; and
    transmitting a translated second certificate to the client.

8. The method of claim 7, wherein the second format and the first format are the same format.

9. The method of claim 7, further comprising communicating with a custom software component to enforce an extension of the certificate issuing policy.

10. The method of claim 7, wherein a client identity is authenticated when the first certificate establishes that the client device has the at least one credential.

11. The method of claim 7, wherein generating the second certificate comprises determining at least one requirement for a form of the second certificate from the certificate issuing policy.

12. A computer readable storage medium bearing computer-executable instructions for issuing security certificates to a client, the computer-executable instructions comprising instructions for:
    loading onto a policy engine a certificate issuing policy;
    receiving a request from the client for a second certificate, the request comprising a first certificate;
    transmitting the first certificate to a translation component;
    at the translation component, translating the first certificate from a first format into a common format;
    transmitting a translated first certificate to the policy engine;
    at the policy engine, determining whether the client is entitled to the second certificate by comparing information from the translated first certificate with the certificate issuing policy;
    generating the second certificate in the common format if the translated first certificate establishes that the client has a credential required by the certificate issuing policy;
    transmitting the second certificate to the translation component;
    at the translation component, translating the second certificate from the common format into a second format; and
    transmitting a translated second certificate to the client.

13. The computer readable storage medium of claim 12, wherein the second format and the first format are the same format.

14. The computer readable storage medium of claim 12, further comprising instructions for communicating with a custom software component to enforce an extension of the certificate issuing policy.

15. The computer readable storage medium of claim 12, wherein a client identity is authenticated when the first certificate establishes that the client has the at least one credential.

16. The computer readable storage medium of claim 12, wherein the instructions for generating the second certificate comprise instructions for determining at least one requirement for a form of the second certificate from the certificate issuing policy.

* * * * *